United States Patent
Cox et al.

(10) Patent No.: US 9,958,867 B2
(45) Date of Patent: May 1, 2018

(54) MONITORING AND CONTROL SYSTEM FOR ENHANCING GROUND MOVEMENT SAFETY IN AIRCRAFT EQUIPPED WITH NON-ENGINE DRIVE MEANS

(71) Applicant: Borealis Technical Limited, London (GB)

(72) Inventors: Isaiah W. Cox, Baltimore, MD (US); Rodney T. Cox, North Plains, OR (US); Jan Vana, Ricany (CZ); Joseph Goldman, Pikesville, MD (US)

(73) Assignee: Borealis Technical Limited, Gibraltar (GI)

( * ) Notice: Subject to any disclaimer, the term of this patent is extended or adjusted under 35 U.S.C. 154(b) by 0 days. days.

(21) Appl. No.: 13/741,362

(22) Filed: Jan. 14, 2013

(65) Prior Publication Data

US 2015/0142214 A1    May 21, 2015

Related U.S. Application Data

(60) Provisional application No. 61/586,637, filed on Jan. 13, 2012.

(51) Int. Cl.
   *B64C 13/18* (2006.01)
   *G05D 1/02* (2006.01)
   *G05D 1/00* (2006.01)

(52) U.S. Cl.
   CPC ......... *G05D 1/0202* (2013.01); *G05D 1/0083* (2013.01)

(58) Field of Classification Search
   CPC ........................... G05D 1/0202; G05D 1/0083
   See application file for complete search history.

(56) References Cited

U.S. PATENT DOCUMENTS

| | | |
|---|---|---|
| 6,118,401 A | 11/2000 | Tognazzini |
| 6,657,334 B1 | 12/2003 | Edelson |
| 6,838,791 B2 | 1/2005 | Edelson |
| 7,116,019 B2 | 10/2006 | Edelson |
| 7,113,202 B2 | 11/2006 | Konya |
| 7,379,014 B1 | 5/2008 | Woodell et al. |

(Continued)

OTHER PUBLICATIONS

WingWatch: Aircraft Ground Collision Avoidance System, www.scss.tcd.ie/Gerard.Lacey/Gerard_Lacey_Homepage/WingWatch.html.

*Primary Examiner* — Jess Whittington

(57) ABSTRACT

An improved monitoring and control system capable of providing automatic control of ground movement in an aircraft equipped with non-engine drive means for autonomous ground movement to enhance airport ground safety and efficient ground travel is provided. The monitoring and control system is installed on aircraft equipped with non-engine drive means controllable to move the aircraft autonomously on the ground and includes monitoring means positioned in locations on the aircraft selected to obtain a maximum amount of information relating to an aircraft's ground position and operation, processor means, data transmission means, and manual or automatic control means to control and direct operation of an aircraft's non-engine drive means to move the aircraft autonomously, safely and efficiently on the ground. The improved monitoring and control system can be employed with one or a number of aircraft simultaneously to increase safety and efficiency of airport ground operations.

9 Claims, 2 Drawing Sheets

(56) References Cited

U.S. PATENT DOCUMENTS

| | | |
|---|---|---|
| 7,445,178 B2 | 11/2008 | McCoskey et al. |
| 7,469,858 B2 | 12/2008 | Edelson |
| 7,891,609 B2 * | 2/2011 | Cox ..................... B64C 25/405 244/100 R |
| 7,983,804 B2 | 7/2011 | Cox et al. |
| 8,022,978 B2 * | 9/2011 | Konya ..................... B64C 25/50 348/113 |
| 2002/0173904 A1 * | 11/2002 | Dow ..................... G08G 1/0104 701/117 |
| 2003/0067542 A1 * | 4/2003 | Monroe ................. H04N 7/181 348/148 |
| 2006/0273686 A1 | 12/2006 | Edelson et al. |
| 2007/0080848 A1 | 4/2007 | Stone et al. |
| 2007/0282491 A1 * | 12/2007 | Cox ..................... B64C 25/40 701/3 |
| 2008/0059053 A1 * | 3/2008 | Cox ..................... B64C 25/405 701/121 |
| 2008/0062011 A1 * | 3/2008 | Butler ..................... G01S 3/783 340/961 |
| 2008/0103642 A1 * | 5/2008 | Cox ..................... G08G 5/065 701/3 |
| 2008/0306691 A1 * | 12/2008 | Louis ..................... G08G 5/06 701/301 |
| 2009/0018713 A1 * | 1/2009 | Coulmeau ............ G08G 5/0013 701/3 |
| 2009/0261197 A1 * | 10/2009 | Cox ..................... B64C 25/36 244/50 |
| 2010/0123599 A1 * | 5/2010 | Hamza ..................... G08G 5/06 340/903 |
| 2010/0241291 A1 * | 9/2010 | Konya ..................... B64C 25/50 701/3 |
| 2011/0127366 A1 * | 6/2011 | Becker ..................... B64F 1/22 244/50 |
| 2011/0259995 A1 | 10/2011 | Frings et al. |
| 2012/0104159 A1 * | 5/2012 | Charles ................. B64C 25/405 244/50 |
| 2012/0168557 A1 * | 7/2012 | Edelson ................. B64C 25/405 244/50 |

* cited by examiner

MONITORING AND CONTROL SYSTEM FOR ENHANCING GROUND MOVEMENT SAFETY IN AIRCRAFT EQUIPPED WITH NON-ENGINE DRIVE MEANS

PRIORITY CLAIM

This application claims priority from U.S. Provisional Patent Application No. 61/586,637, filed Jan. 13, 2012, the disclosure of which is fully incorporated herein.

TECHNICAL FIELD

The present invention relates generally to the monitoring and control of ground movement of aircraft in an airport or other ground environment and specifically to an improved system designed to monitor and control the ground travel of aircraft equipped with non-engine drive means controllable to move the aircraft independently and safely on the ground to maximize the safe and efficient movement of the aircraft, effectively improving airport operations.

BACKGROUND OF THE INVENTION

In today's airport environment, safely and efficiently navigating aircraft from the time an aircraft has entered controlled airspace and while the aircraft is maneuvered during ground travel after landing and then to a runway prior to takeoff presents challenges for all concerned with this process. Increased numbers of flights and larger aircraft that must use airport facilities not designed to handle them has contributed to these challenges. Airline regulatory agencies, aircraft manufacturers and airlines have worked to achieve a high level of flight safety by investing in overlapping safety systems that prevent errors which have effectively improved the safety of aircraft in flight. Airport ground operations, however, have not yet achieved a comparable level of safety. A recent estimate indicated that the aircraft industry losses for physical damage resulting from accidents and incidents on the ground can approach US$11 billion annually. The systems employed to produce the aforementioned high levels of flight safety, unfortunately, are not transferrable to ground operations. The congested nature of airport ramp areas and taxiways coupled with time pressures to move aircraft as quickly as possible between arrival and departure produces situations in which ground incidents, including collisions between aircraft, ground service vehicles, and other objects and obstacles, leading to injuries are not only possible, but very likely.

Increasing the safety of aircraft ground movement between landing and takeoff and minimizing the likelihood of ground incidents are being addressed, and aircraft systems that can improve aircraft ground safety have been proposed. In U.S. Pat. No. 7,113,202 and related U.S. Patent Application Publication No. U.S.2010/0241291 to Konya, for example, an automatic taxi control system that controls the direction of aircraft ground travel is described. An "auto-tiller" concept is used to automatically and precisely control aircraft nose wheel steering to maintain aircraft travel along a desired nose wheel taxiline as the aircraft maneuvers through limited taxi and parking space by precisely sensing and computing and correcting for nose wheel deviation from the taxiline. The path of aircraft travel may be sensed by a video tracking system that uses the aircraft's onboard taxi camera system with appropriate sensors that may be on the aircraft or on the ground, a tracking control system, and the nose gear steering system. The provision of emergency automatic collision avoidance steering/braking means is also suggested. This system is tied specifically to the aircraft steering system to provide automatic taxiing capability, including the turning choice decision at taxiway intersections based on a digital airport map and GPS-guided locator, with little or no pilot input.

The WingWatch aircraft ground collision avoidance system described at www.scss.tcd.ie/Gerard.Lacey describes an obstacle detection system using different types of sensors that can be mounted on aircraft or ground service vehicles to detect the presence of objects, including aircraft, other vehicles, persons, and the like, within an area around an aircraft that are potential collision threats. Sensors preferred for this purpose are cameras mounted at specific positions on the aircraft used in combination with computer vision techniques and software in communication with a pilot warning interface.

U.S. Pat. No. 7,379,014 to Woodell et al describes a radar system to be used during aircraft taxi to detect obstacles. This system is stated to be more reliable than cameras, which are asserted to fail under some precipitation situations in which the disclosed radar system effectively detects obstacles that could pose collision hazards. In U.S. Pat. No. 6,118,401, Tognazzi discloses an aircraft ground collision system and method that can be used during taxi or towing. This system includes both a video and a radar unit mounted in an aircraft wing tip to detect proximity of an object coupled with an audio or visual warning indicator that a collision is imminent. The aircraft ground collision avoidance system described by Stone et al in U.S. Patent Application Publication No. U.S.2007/0080848 uses a processor, transceiver, and memory to process, communicate, and store information relating to two aircraft that will enhance situational awareness and prevent collisions.

While the foregoing patents and publications may describe systems and devices that can improve aircraft ground travel efficiency and safety, they do not suggested that these system or devices could be adapted for use in monitoring or controlling the ground movement of aircraft that are autonomously and independently driven on the ground by non-engine drive means. In U.S. Patent Application Publication No. U.S.2011/0259995, Frings et al describes a method for moving an aircraft along the ground using at least two separate appliances, described as tractors, which are attached to and detached from the aircraft main landing gear to move the aircraft on the ground without the aircraft engines. Cameras on the appliances are provided to ensure that the appliances are properly approaching the aircraft landing gear and that the landing gear has not been damaged when the appliances are detached. While the system described by Frings et al may provide a way to move an aircraft without using the aircraft's main engines, it does not monitor or control aircraft ground movement in response to monitoring. Moreover, the appliances used to move the aircraft are separate structures that must be returned to a ramp or gate area for reuse and, therefore, could increase congestion in an area already crowded with aircraft and accessory ground vehicles. In U.S. Pat. No. 7,445,178, McCoskey et al describes a precision guidance system requiring ground elements that interact with aircraft elements to control the direction of movement of an aircraft on the ground during taxi with a powered nose aircraft wheel system. It is not suggested that the guidance system of McCoskey et al, which is specifically directed to aircraft ground travel route control, could function without the tarmac guidance elements. McCoskey et al, moreover, is otherwise silent with respect to a system for monitoring and controlling aircraft ground movement that controls operation of a non-engine drive means to move an aircraft as required to avoid collision and enhance the safety or efficiency of airport ground operations without the use of ground-based or like structures in the airport environment.

Commonly owned U.S. Pat. No. 7,983,804 to Cox et al describes a system for minimizing aircraft damage on collision in a vehicle, including an aircraft, with at least one self-propelled nose wheel. This system, which has a motor in the self-propelled wheel, includes means for measuring the speed of travel and torque of the wheel and monitoring the torque or the torque:speed ratio and signaling the motor to stop when the torque or the torque:speed ratio exceeds a given value that may be indicative of resistance caused by a colliding obstacle, including a rut in the ground surface. Substantially constant monitoring of speed and torque allows the motor to be stopped automatically or manually when a warning is communicated to the pilot before damage is caused by the collision. It is not suggested either that ground travel variables other than speed and torque could be monitored or that the aircraft could be monitored to provide automatic control of movement during independent ground travel to enhance the safety and efficiency of airport ground operations.

A need exists, therefore, for an improved monitoring and control system capable of providing automatic control of ground movement in one or more aircraft equipped with non-engine drive means to increase airport ground safety and the safety and efficiency of aircraft ground travel, thereby improving the efficiency of airport ground operations and enhancing the efficient utilization of airport facilities.

SUMMARY OF THE INVENTION

It is a primary object of the present invention, therefore, to provide an improved monitoring and control system capable of providing automatic control of ground movement in aircraft equipped with non-engine drive means to increase airport ground safety and efficiency and to improve aircraft ground travel safety and efficiency.

It is another object of the present invention to provide an improved monitoring and control system capable of providing automatic control of ground movement in aircraft equipped with non-engine drive means that cooperates with existing aircraft and airport systems to move the aircraft along a ground travel path that avoids collision with moving and non-moving obstacles.

It is another object of the present invention to provide an improved monitoring and control system capable of providing automatic control of ground movement in aircraft equipped with non-engine drive means that improves the safety and efficiency of airport ground operations by providing information required to ensure the safe operation of aircraft in the airport ground environment in real time to instruments and to aircraft and airport personnel.

It is another object of the present invention to provide an improved monitoring and control system capable of providing manual and automatic control of ground movement in aircraft equipped with non-engine drive means that uses existing aircraft data transmission and other related systems, is light and simple, and can be easily and quickly installed.

It is an additional object of the present invention to provide an improved monitoring and control system capable of providing manual and automatic control of ground movement in aircraft equipped with non-engine drive means with a range of monitoring means that obtain a maximum amount of information, thereby improving the efficiency of and optimizing manual or automatic control of aircraft ground travel and airport ground operations.

It is a further object of the present invention to provide an improved monitoring and control system capable of providing manual and automatic control of ground movement in aircraft equipped with non-engine drive means that employs existing aircraft wireless networks and/or additional onboard wireless networks to transfer monitoring and control data within the system.

It is yet a further object of the present invention to provide an improved monitoring and control system capable of providing manual or automatic control of ground movement in aircraft equipped with non-engine drive means that employs existing aircraft and airport wireless communication networks to monitor and control ground movement and ground operations of all aircraft under an airport's air traffic control.

It is yet an another object of the present invention to enhance the efficiency of airport ground operations by providing an improved monitoring and control system capable of providing manual and automatic control of ground movement in one or more aircraft equipped with non-engine drive means in an airport environment that substantially eliminates ground personnel needed to monitor an aircraft's wings and clearance during pushback and/or taxi.

It is yet an additional object of the present invention to provide a method for improving aircraft situational awareness and airport ground safety in one or more aircraft under air traffic control in an airport ground environment with an improved monitoring and control method for providing manual or automatic control of ground movement in aircraft equipped with non-engine drive means.

It is a still further object of the present invention to provide an improved monitoring and control method for automatically or manually controlling ground movement in aircraft equipped with non-engine drive means to enhance airport ground safety and efficient ground travel.

In accordance with the aforesaid objects, an improved monitoring and control system capable of providing manual or automatic control of ground movement in aircraft equipped with non-engine drive means to increase airport ground safety and enhance efficient ground travel for individual aircraft or all aircraft under air traffic control in an airport environment is provided. The monitoring and control system is installed on aircraft equipped with non-engine drive means controllable to move the aircraft independently on the ground and includes monitoring means positioned in locations on the aircraft selected to obtain a maximum amount of information relating to an aircraft's ground position and operation, processor means to receive, store, and process information obtained by the monitoring means, data transmission means to communicate information from the monitoring means to and from the processor means, and manual or automatic control means to control operation of the aircraft's non-engine drive means to move the aircraft safely on the ground in response to the information from the processor means. The present monitoring and control system can be effectively used with or without assistance or guidance from air traffic control to monitor and control ground movement in a single aircraft or in all aircraft equipped with non-engine drive means for independent ground movement of these aircraft in an airport ground environment.

Other objects and advantages will be apparent from the following description, claims, and drawings.

DESCRIPTION OF THE INVENTION

Figure 1:
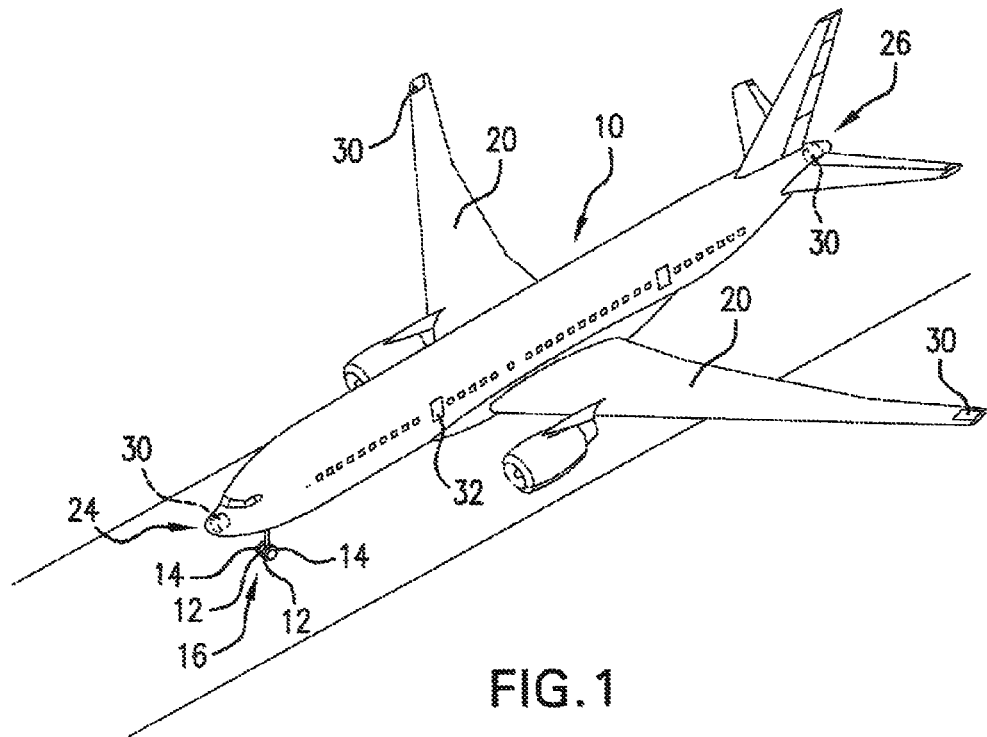
FIG. 1 illustrates, in perspective view, an aircraft equipped with non-engine drive means and the monitoring and control system of the present invention on the ground in an airport environment.

The operation of airlines and airports today focuses on achieving maximum efficiency to keep operating costs as low as possible while continuing to provide travelers with a safe and economical mode of travel. Once aircraft come within the jurisdiction of air traffic control at an airport, ensuring that the aircraft are moved safely and effectively until they leave the airport's air traffic control jurisdiction will improve and increase airport operating efficiency. To accomplish this, aircraft should be monitored and controlled from the time they enter an airport's air space until they leave. This includes monitoring and controlling aircraft in the air as they approach the airport's airspace, while they are still in the air in conjunction with landing, upon landing, during the entire range of ground maneuvers required to reach a parking location or gate, and, upon departure, reversing these ground and air maneuvers until the aircraft has taken off and left the airport's air traffic control. Not only can airport operating efficiency be improved, but the value of the airport can be increased, which will attract more aircraft to use the facility and also reduce the costs associated with all or part of the aforementioned landing and takeoff cycles for these aircraft. The resulting increases in airport and aircraft ground traffic may be accompanied by an increased risk of ground incidents involving aircraft, ground vehicles, and even passengers and ground personnel. Improving the efficiency of an airport's entire takeoff and landing cycle should not be at the expense of increased ground safety risks. Runway and ramp congestion caused by increasing numbers of flights, stringent aircraft scheduling requirements, and efforts to squeeze large jets into gates originally designed for much smaller aircraft contributes to airport traffic jams and reduced maneuvering space in the ramp area. Some studies have indicated that the location of most of the incidents resulting in damage that occur during aircraft ground travel happen at the ramp entry or exit area. At this location, taxi lines leading into and out of the gate area converge, and an aircraft is less likely to be in communication with ground traffic or other controllers. Increased pilot and cockpit crew situational awareness is critical in these situations. The present improved monitoring and control system for independent and/or air traffic control-assisted or controlled ground movement in non-engine drive means-equipped aircraft permits a level of monitoring and control over aircraft ground travel on runways as well as in ramp areas not heretofore possible. The present improved monitoring and control system further provides monitoring and control for aircraft while in a flight pattern above an airport, both when aircraft are in landing mode and when aircraft are in takeoff mode and leaving the airport's controlled air space that has not been available.

When an aircraft touches down on an airport runway, the pilot and cockpit crew must direct the moving aircraft along the airport's runway system to an ultimate parking location. The timing of an aircraft's landing event is to some degree impacted by the availability of taxiways required to get to assigned arrival gates or parking locations and by the availability of these arrival destinations. If taxiways and/or gates are not going to be available when an aircraft lands, the result is aircraft stacked above an airport waiting for clearance to land. Upon landing, the distance and runway route to be traveled depends on the specific airport and can vary quite widely. Some airports have a limited number of runways that can be easily navigated with few turns or stops, and other airports require the cockpit crew to negotiate a more complex path between landing and arrival at a gate or other parking location. The aircraft's actual ground travel route can generally be improved by ground control in consultation with the pilot. Whether an aircraft's taxi path is simple or convoluted, the pilot and cockpit crew today have the most knowledge and best available information to control the aircraft's speed and direction of movement during taxi while also visually checking the location and movements of other aircraft and everything else along the taxi path and in the ramp area. With the monitoring and control system of the present invention, this process can be assisted by air traffic control with actual situational awareness of all aircraft, including exact aircraft locations, aircraft speed, and aircraft direction of movement in real time. Providing such information to pilots of all aircraft at an airport that are equipped with non-engine drive means will improve pilot situational awareness and increase the efficiency with which an aircraft can be driven from an active runway to a gate to unload passengers and/or freight. Today, although the initial stage of an aircraft's pushback operation is currently guided by ground personnel, the taxi process from the completion of pushback to takeoff of the aircraft requires at least the same, and usually more, vigilance and attention to aircraft operation and environment as taxi in upon arrival.

Until the present invention, pilots were required to actively maintain aircraft ground travel speed within required limits by constantly controlling throttle position on one or more of the aircraft's engines. A combination of nose wheel steering, power application, and braking, including differential braking, is necessary to move and turn an aircraft and control taxi speed in conjunction with operation of the aircraft's engines. As a result, the pilot's and cockpit crew's situational awareness during taxi has not always been optimum. The monitoring and control system and method of the present invention enables every pilot and the crew of every aircraft equipped with non-engine drive means to have a significantly improved level of aircraft environmental and operational awareness when taxi is controlled by non-engine drive means independently of the aircraft's engines. This significantly enhances the safety and efficiency of airport ground operations. Additionally, the improved airport ground operations possible with the present invention can directly enhance the efficiency with which incoming air traffic can be handled by the airport during all stages of the landing and ground maneuvering to an ultimate arrival gate or other location.

The term non-engine drive means, as used herein, refers to any onboard drive means, whether or not located in a wheel, capable of moving an aircraft on the ground. Non-engine drive means are preferably powered by an aircraft's auxiliary power unit, although other power sources could also be used to supplement or replace the APU as a source of power. These power sources can include, for example and without limitation, fuel cells, any kind of solar power, POWER CHIPS™, and burn boxes, as well as any other power source suitable for this purpose.

In an aircraft equipped with non-engine drive means controllable to move the aircraft on the ground, the aircraft's engines are not required for taxi, pushback, or other ground movement and, ideally, are operated only minimally while the aircraft is on the ground. Substantially eliminating the use of the aircraft engines during aircraft ground travel contributes to an improved airport environment by eliminating the jet blast, engine ingestion, noise, and air pollution and produces safer, quieter runways and ramps. The monitoring and control system of the present invention enables airports to accommodate and service more aircraft while still achieving these benefits. Ground movement of the aircraft is produced instead by the operation of non-engine drive means associated with one or more of the aircraft wheels. Non-engine drive means do not rely on operation of the aircraft's engines, but are powered independently, as indicated above, to cause one or more of the aircraft's wheels to rotate at a desired speed, or at a torque associated with a desired speed, while the aircraft is on the ground, thus providing the power to make the aircraft to move at the runway speed. Any one or more of an aircraft's wheels, including, for example, one or more nose wheels and/or one or more main wheels, can be powered or driven by a non-engine drive means. While a preferred location for a non-engine drive means is adjacent to or within an aircraft wheel, non-engine drive means locations are not limited. A non-engine drive means can be positioned at any location where it can be connected with one or more aircraft wheels to provide the driving power required to move the aircraft wheel or wheels at a desired speed or torque and, hence, the aircraft at a desired speed on the ground. Possible locations for one or more drive means in addition to those within or adjacent to a wheel include, without limitation, on or near the wheel axle, in, on or near a landing gear bay or landing gear component, or any convenient onboard location in, on, or attached to the aircraft.

The drive means for the non-engine drive means is preferably an electric motor. The current and the voltage and frequency of the current applied to an electric motor can be controlled to regulate speed. As discussed above, current to power the motor preferably originates with the aircraft auxiliary power unit (APU). Control of the flow of current to the drive means as well as the voltage and frequency of the current, allows the torque generated by the drive means to be controlled and, therefore, control of the speed of the wheel powered by the drive means and the ground travel speed of the aircraft. An electric motor preferred for use as the non-engine drive means of the present invention could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use in the present invention.

The non-engine drive means selected should be able to move an aircraft wheel at a desired speed and torque. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. As indicated above, any form of electric motor capable of driving a nose or main landing gear wheel to move an aircraft on the ground may also be used. Other motor designs capable of high torque operation across the desired speed range that can move an aircraft wheel to function as described herein may also be suitable for use in the present invention, such as, for example, suitable hydraulic and pneumatic motors. One non-engine drive means particularly preferred for use with the monitoring and control system and method of the present invention is a high phase order induction motor with a top tangential speed of about 15,000 linear feet per minute and a maximum rotor speed of about 7200 rpm. With an effective wheel diameter of about 27 inches and an appropriate gear ratio, an optimum top speed of about 28 miles per hour (mph) may be achieved, although any speed appropriate for aircraft ground travel in a particular runway environment could be achieved.

Non-engine drive means in accordance with the present invention are specifically designed to be retrofitted on existing aircraft without requiring changes to existing wheel structures. If the non-engine drive means is located in or on a nose or main landing gear wheel, and if the existing wheel structures already in use on the aircraft are not altered from their original condition or otherwise changed in any way by the installation of the non-engine drive means, they can still be used. Re-certification by the FAA or other authorities would not be required, thus eliminating a potentially time consuming and costly process. A different onboard location of the non-engine drive means that would not require re-certification could also be chosen. Additionally, the controls required to operate a non-engine drive means as described herein can be retrofitted within the existing cockpit controls.

Figure 2:
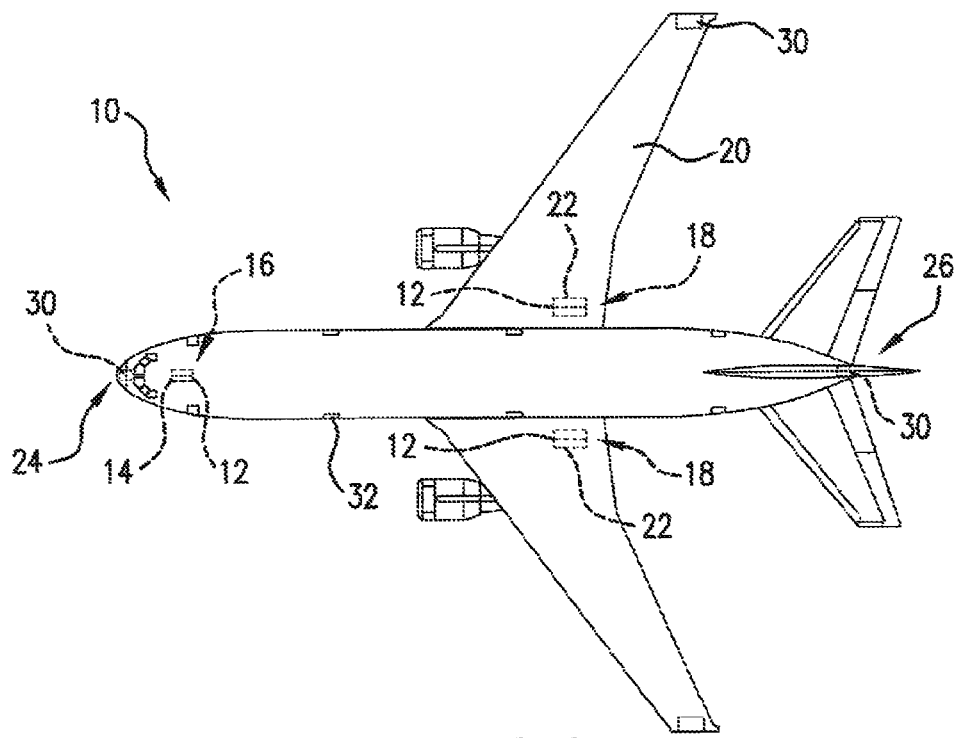
FIG. 2 illustrates, in top view, an aircraft equipped with non-engine drive means and the monitoring and control system of the present invention on the ground in an airport environment.

Referring to the drawings, FIG. 1 illustrates a perspective view of an aircraft 10 equipped with non-engine drive means and the monitoring and control system of the present invention. As discussed above, the non-engine drive means can be located in a number of locations. In FIG. 1, a non-engine drive means 12 is located in each wheel 14 of the nose landing gear 16. The location of a non-engine drive means 12 in only one of the wheels 14 of the nose landing gear is also contemplated to be within the scope of the present invention. Non-engine drive means may also be located in driving relationship with one or more of the main landing gear wheels, which are not shown in FIG. 1, but are shown in FIG. 2, which presents a top view of aircraft 10. In this aircraft, there are two sets of main landing gear 18 shown relative to the aircraft wings 20. Each main landing gear 18 typically has four, and possibly more, wheels 22, only one of which is labeled in FIG. 2. One or more non-engine drive means 12 may be positioned at a suitable location in driving relationship with one or more of the aircraft main landing gear wheels 22.

The monitoring and control system of the present invention preferably includes at least monitoring means, processor means, data transmission means, and control means. Other elements may additionally be included as discussed below. The monitoring means may include a wide range of monitoring devices capable of obtaining information about operating parameters of, for example, the non-engine drive means, the landing gear, the wheels, and the aircraft, as well as information relating to environmental and other conditions external to the aircraft and in the aircraft's ground environment. The monitoring means should, in addition, be capable of obtaining information about the location of all other aircraft on the ground or in an airport's the controlled air space, including, but not limited to, their location, speed, and proximity to all other aircraft and all other vehicles on runways, taxiways, in ramp areas, and at gates. Such monitoring devices may be permanently or temporarily mounted, for example without limitation, externally on the aircraft exterior, internally or externally in or on the drive means and/or landing gear, on airport ground service vehicles, on runway and airport structures, and even on airport ground personnel. Other locations for monitoring means that may provide information that can be used to independently move an aircraft equipped with non-engine drive means on the ground are also contemplated to be within the scope of the present invention. The monitoring means should be selected and located to provide maximum information relating to the aircraft's location and path of ground travel. It is contemplated that this information will be provided to aircraft pilots and all other parties, such as, for example, air traffic control ground traffic control, ground equipment operators, and all others who require this information to produce safe and efficient airport ground operations in real time. The information obtained by the monitoring means may be presented in a form equivalent to a real time video game, with the airport and its operations depicted on an interactive screen accessible to those with the responsibility for ensuring the overall safety and efficiency of airport operations.

The type of information desired that relates to aircraft operating parameters, aircraft or airport environmental conditions, airport support equipment, and/or a specific aircraft to be monitored and controlled according to the present invention will dictate the types, numbers, and locations of the specific monitoring means used. Many operating parameters and environmental conditions will always require monitoring, and it is expected that all non-engine drive means-equipped aircraft will have monitoring means capable of obtaining information about these parameters and conditions. It is also expected that all aircraft and airport support equipment may be similarly monitored and integrated into airport control systems. The control of independent aircraft ground movement by non-engine drive means requires information about wheel speed and drive means torque. In the monitoring and control system of the present invention, therefore, speed and torque sensors will be provided in a location on the aircraft where this information can be readily obtained. Sensors that monitor the operation of other aircraft or drive means parameters or conditions are also contemplated, such as, for example, the status and/or operation of the aircraft APU or other drive means power supply. In addition to speed, torque, and/or other operational sensors, sensors that monitor and communicate information about an aircraft's external environment and/or airport ground operations are also contemplated for use with the present invention. Sensors that can monitor and obtain information relating to the presence of objects in an aircraft's surrounding environment that are potential collision threats and the aircraft's location and travel path relative to these objects, as well as sensors that obtain information about environmental conditions such as air temperature, for example, are intended to be included in the present monitoring and control system. Such sensors may include, for example without limitation, laser detectors, radar, sonar, cameras of all types, proximity sensors, and the like. Some of these sensors will be more suitable for some aircraft and/or airport locations than for others.

FIGS. 1 and 2 illustrate possible locations for some sensors in accordance with the present invention. These locations are illustrative only and may not be optimum locations for all types of aircraft or for all types of sensors. The placement of monitoring means, including sensors, should preferably be selected to provide maximum information about the aircraft's position during independent ground travel and the aircraft's position relative to objects that could interrupt ground travel, including other aircraft, airport structures, ground vehicles, airport ground personnel, and the like. The overall dimensions of an aircraft, from nose to tail and wing tip to wing tip, define an area where collisions are highly likely to occur if another object is present within this space. At a minimum, monitoring means 30 should be located at an outer extent of each of the aircraft's wings 20, since an aircraft's wings tend to be the structures most likely to be involved in a collision event. To enhance monitoring of aircraft ground movement, particularly in connection with automatic independent ground movement as discussed below, monitoring means 30 could also be located on the nose end 24 of the aircraft and at the tail end of the aircraft 26, as shown in FIGS. 1 and 2.

One type of monitoring means 30 preferred for location on an aircraft 10 as shown in FIGS. 1 and 2 and discussed above is one or more cameras of the type designed specifically for external aircraft use that provide images to the cockpit. Such cameras are available from Securaplane Technologies Inc. of Tucson, Az. The installation of a camera in the locations shown provides the aircraft pilot and flight crew with a real time visual display of the area within the camera's vision and, therefore, can provide an instant visual indication of a possible collision event, enabling an immediate manual or automatic control operation in response to avoid collision. The monitoring means 30 may be, alternatively or in addition to a monitoring camera, a type of sensor known as a proximity sensor that senses the presence of an object within a predetermined distance from the sensor. If such a sensor is used alone without a camera, the indication of the presence of an object that could pose a collision threat to the aircraft would be communicated to the cockpit, preferably in the form of an audio signal or a visual signal, such as a flashing light. A combination of a camera and a proximity sensor for monitoring means 30 will not only provide maximum information about the surrounding environment, but will also provide an actual visual image of any sensed collision threat. The information obtained from monitoring means 30, which is preferably transmitted through the processor means to the aircraft cockpit for use by the pilot and flight crew, could, in addition, be transmitted to ground control personnel, air traffic control personnel, and/or all aircraft and vehicles, wherever located at an airport, which enables the use of this information to improve the safety of airport ground operations, as well as the safety of landing and takeoff cycles.

Other monitoring means (not shown) that obtain other additional information relating to the efficiency and safety of the independent ground travel of an aircraft equipped with non-engine drive means could also be installed on aircraft 10. In addition to the speed and torque sensors discussed above, such monitoring means could include, for example without limitation, wheel traction sensors, wind speed sensors, global positioning (GPS) sensors, and the like.

The monitoring and control system of the present invention further includes processor means 32, preferably located in a convenient position in the aircraft, as shown schematically in FIGS. 1 and 2. The processor means 32 receives information obtained by the monitoring means 30, processes this information as required, stores this information as appropriate, and transmits the processed information to a control means, as described below, or elsewhere, as needed. Suitable processor means may include microprocessors and other similar processor means capable of being programmed to evaluate and process the information obtained by the monitoring means and to perform other functions required by the present monitoring and control system. Data transmission means (not shown) are provided to transmit information from the monitoring means to the processor means and other system components. The data transmission means may be wire connections between these system components conventionally used to transmit data. It is preferred, however, that the data transmission means be wireless and associated with a wireless communication network. Not only does the use of wireless data transmission provide a significant degree of flexibility, but the installation of the present monitoring and control system on an existing aircraft is simplified. An aircraft's existing wireless communication network can be used to transfer data signals for the present monitoring and control system. If necessary, the aircraft's existing wireless data transmission capability can be expanded to handle this task. In either case, installation of the monitoring and control system can be accomplished quickly and simply. The use of wireless data transmission also simplifies the remote control of the present monitoring and control system from a location external to the aircraft and its access by ground and air traffic control. Additionally, the use of wireless data transmission produces airport operating efficiencies that encompass the entire landing and takeoff cycle for all of the aircraft using the airport.

The present monitoring and control system additionally includes control means designed to control independent ground travel of a non-engine drive means-equipped aircraft in response to the information obtained by the monitoring means and processed by the processor means. The control means may be manual or automatic. Manual control means are contemplated to include, for example, cockpit control switches and the like already provided for pilot control of the operation of the aircraft non-engine drive means 12 or new controls, as needed, located in the cockpit or in another convenient location. As indicated above, when either or both of a camera video display or a warning signal from a proximity sensor indicates a potential collision threat or other situation requiring a change in the aircraft's ground movement, the cockpit controls could be manually activated to produce the required change in autonomous aircraft ground travel. It is preferred that the control means of the present system be operated automatically, by intelligent software or the like, to produce an automatic response by the non-engine drive means without requiring pilot input when information obtained from the monitoring means through the processor means indicates that operation of the non-engine drive means 12 must be altered from its present operational state.

The detection of an airport ground vehicle within a predetermined distance by a proximity sensor or of an approaching aircraft by a wing tip camera, for example, is transmitted to the automatic control means, which automatically directs the non-engine drive means to stop, start, or slow down and/or to change the direction of travel. The direction of travel can be changed by the non-engine drive means when each of the nose gear wheels is driven by a non-engine drive means, and each non-engine drive means can be selectively operated to steer the aircraft as it moves autonomously on the ground. Otherwise, the monitoring and control system would also include control connection and communication with the nose wheel steering system. Pilot input is not required with fully automatic control means; however, an override control element is preferably provided that can be used by the flight crew or remotely accessed in the event the automatic control means must be inactivated.

Figure 3:
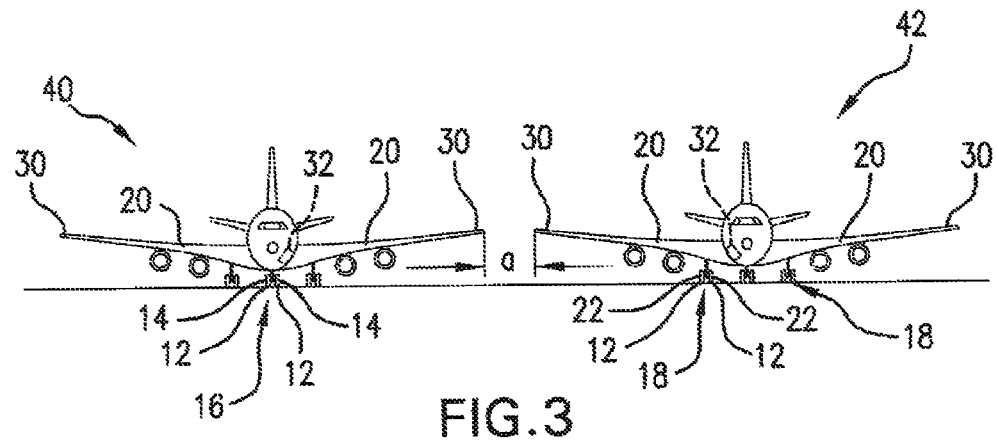
FIG. 3 illustrates, in front view, two aircraft equipped with non-engine drive means and the monitoring and control system of the present invention on the ground in an airport environment.

FIG. 3 illustrates a front view of two aircraft 40 and 42 equipped with non-engine drive means 12. Aircraft 40 has non-engine drive means 12 installed on each of the nose gear 16 wheels 14, and aircraft 42 has non-engine drive means 12 installed on each wheel 22 in a main landing gear 18. Other combinations of non-engine drive means installations are also possible. For example, nose gear 16 could have only one non-engine drive means 12 installed to drive one wheel 14, or one non-engine drive means 12 could be installed on one wheel 22 of a main landing gear 18 and on one wheel 22 of a main landing gear 18 on the opposite side of the aircraft. Monitoring means 30 are shown located on the tips of each wing 20, although, as discussed above, monitoring means could also be positioned in additional locations. It should be noted from FIG. 3 that the distance labeled a between the adjacent wings 20 of aircraft 40 and aircraft 42 provides a clearance distance that is not likely to result in a collision between these adjacent aircraft wings as long as both aircraft continue along a ground travel path that maintains this separation. The monitoring means 30 on each wing tip provide the information required for operating each aircraft's non-engine drive means 12 to move aircraft 40 and aircraft 42 autonomously on the ground along a path that maintains a separation distance that will avoid a collision between their wing tips or any other part of the aircraft or other object.

Figure 4:
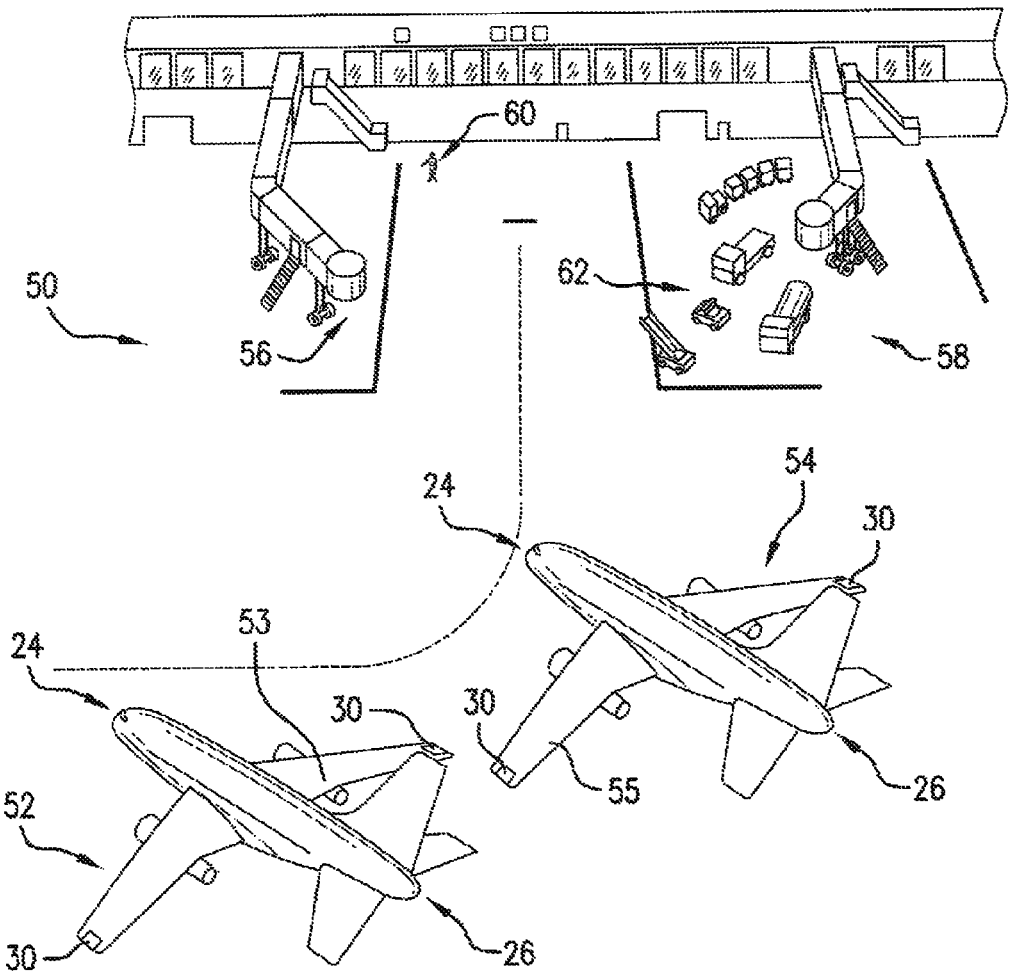
FIG. 4 illustrates an airport ramp area with two aircraft equipped with non-engine drive means and the monitoring and control system of the present invention on the ground in a potential collision situation.

FIG. 4 illustrates an airport ramp area 50 with two aircraft 52 and 54 approaching the ramp entrance and a gate 56 and a gate 58. A ground control operator 60 is positioned adjacent to gate 56 to guide aircraft 52 into the gate. Ground service vehicles 62 are located close to gate 58 to service aircraft 52. Aircraft 54, however, is also approaching gate 56. Before the monitoring and control system of the present invention, this scenario would very likely have resulted in a collision between wing 53 of aircraft 52 and wing 55 of aircraft 54 if each aircraft continued to travel along the paths indicated in FIG. 4. There is no separation distance a between wing 53 and wing 55 as shown in FIG. 3. With the monitoring and control system of the present invention, however, both aircraft 52 and aircraft 54 are equipped with non-engine drive means controllable to move the aircraft autonomously on the ground and monitoring means 30, located on each wing tip. Each of the monitoring means 30 on wings 53 and 55 will either view or sense the presence of the wing of the adjacent aircraft, depending on the specific monitoring means installed, process this information, and transmit the information to a control means as discussed above. The information is also transmitted to pilots of each aircraft and to ground traffic control, including the operator 60, and air traffic control. The present system preferably automatically signals the non-engine drive means, which can act as a brake, to stop, thereby stopping the forward movement of the aircraft. From the relative positions of the aircraft shown in FIG. 4, the present system might also signal aircraft 54 to change direction of ground movement to move away from aircraft 52. Alternatively, if the system is not automatic, upon receiving a signal from the system, the aircraft pilot or the ground control operator 60, if the system has been set up wirelessly with remote access, could manually stop the ground travel of aircraft 52 and 54. When the data transmission means are wireless and the information and/or signal is transmitted wirelessly, control of the drive means could be effected by ground control or air traffic control personnel.

It is contemplated that the monitoring and control system of the present invention can be used to monitor and control all autonomous aircraft ground travel, including taxi, pushback, and other ground movement of a single aircraft or of all aircraft in an airport ground environment. The combination of monitoring means and automatic control means with non-engine drive means controllable to move aircraft independently on the ground enables aircraft equipped with these monitoring and automatic control means to travel on the ground safely and efficiently during taxi and pushback with only minimal or even no ground personnel support. It is no longer necessary to provide wing walkers or other ground personnel to walk with an aircraft during pushback. The clearance monitoring function provided by these ground personnel is accomplished by cameras, sensors, and other monitoring means. To increase the safety and efficiency of ground operations in a ramp area, such as ramp area 50 in FIG. 4, ground service vehicles 62, gates, 56 and 58, and even ground operator 60 could also be provided with monitoring means that would communicate the positions of these objects and structures to the present monitoring and control system on a non-engine drive means-equipped aircraft entering or leaving the ramp area. The risk of collisions involving them and the aircraft could then be substantially eliminated.

It is further contemplated that the present monitoring and control system could be used in an airport environment with multiple aircraft that are equipped with non-engine drive means for autonomous ground travel as described herein. This would provide the ability to simultaneously monitor and control the ground movement of these aircraft, significantly increasing the efficiency and safety of the airport environment, which will significantly improve the safety and efficiency of airport ground operations for all aircraft.

While the present invention has been described with respect to preferred embodiments, this is not intended to be limiting, and other arrangements and structures that perform the required functions are contemplated to be within the scope of the present invention.

INDUSTRIAL APPLICABILITY

The monitoring and control system of the present invention will find its primary applicability in enhancing the safety and efficiency of the entire landing and takeoff cycle of all aircraft using an airport as well as in ensuring safe and efficient aircraft ground travel and in producing an airport ground travel environment where safety and efficiency are greatly improved and the likelihood of collisions or other incidents during aircraft taxi, pushback, and other ground movement is substantially eliminated.

The invention claimed is:

1. An improved monitoring and control method that enhances pilot situational awareness and ground travel safety of aircraft driven independently without aircraft engines during ground travel into and out of and within ramp areas at an airport, comprising:

a. equipping one or more aircraft for independent ground travel without aircraft engines by mounting electric drive motors within nose landing gear wheels or within main landing gear wheels and operating the electric drive motors to drive the one or more aircraft independently during ground travel into and out of and within the ramp areas at the airport;

b. defining a clearance distance determined to prevent a collision between aircraft wings of the one or more aircraft and other aircraft, ground vehicles, ground objects, and ground personnel that are potential collision or ground incident threats as the aircraft are driven by the electric drive motors during the ground travel;

c. mounting selected monitoring and sensing devices in selected information-obtaining locations on the one or more aircraft comprising locating speed sensors and torque sensors on the electric drive motors and on the nose or main landing gear wheels, and locating proximity sensors, cameras, or both proximity sensors and cameras on one or more aircraft exterior surfaces comprising a tip of each wing, a nose end, a tail end, and landing gears;

d. obtaining information from the monitoring and sensing devices in real time as the electric drive motors are operated to drive the one or more aircraft independently during the ground travel obtaining real time information and processing the obtained information to identify potential collision or ground incident threats within the defined clearance distance, and transmitting the processed information to a control system on the one or more aircraft; and e. in response to the processed information identifying a potential collision or ground incident threat within the defined clearance distance, automatically or manually operating the electric drive motors as required to continue moving the one or more aircraft along a ground travel path that maintains the defined clearance distance and avoids the identified potential collision or ground incident threat or to stop the one or more aircraft when the identified potential collision or ground incident threat is present within the defined clearance distance.

2. The method of claim 1, further comprising when the potential collision or ground incident threat is identified by the processed information obtained from the proximity sensors, the cameras, or the both proximity sensors and cameras located on a wing tip of the one or more aircraft to be a wing or wing tip of another aircraft adjacent to one of the one or more aircraft, transmitting the processed information from the proximity sensors, the cameras, or both the proximity sensors and cameras to the control system, and automatically controlling operation of the electric drive motors with the control system in response to the transmitted processed information to alter the ground travel path of the one or more aircraft, and maintaining the defined clearance distance between the wing tip of the one or more aircraft and the wing or wing tip of the adjacent aircraft during the ground travel.

3. The method of claim 1, further comprising transmitting the processed information from the selected monitoring and sensing devices to the control system through a wireless network present on the one or more aircraft or through an airport wireless network in communication with the wireless networks present on the one or more aircraft.

4. The method of claim 1, further comprising positioning the cameras on the one or more nose or main landing gears of the one or more aircraft.

5. The method of claim 1, further comprising positioning the speed sensors and torque sensors in the information-obtaining locations on the electric drive motors and on nose or main landing gear wheels where the electric drive motors are mounted, obtaining the information relating to operating parameters of the electric drive motors and the nose or main landing gear wheels where the electric drive motors are mounted, transmitting the obtained information to the processor and then transmitting the processed information to the control system, and automatically controlling operation of the electric drive motors through the control system in response to the processed information to continue to drive or stop driving the aircraft as indicated by the processed information.

6. The method of claim 1, further comprising automatically generating a warning signal in response to the processed information indicating presence of a potential collision or ground incident threat within the defined clearance distance and automatically, stopping operation, or not starting operation of the electric drive motors as required to avoid a ground incident or collision.

7. The method of claim 1, further comprising automatically generating a warning signal when presence of a potential collision or ground incident threat within the defined clearance distance is indicated by the processed information, providing a pilot override control and manually activating the pilot override control to stop operation of the electric drive motors in response to the warning signal when the electric drive motors are operated automatically.

8. The method of claim 1, further comprising providing in the control system control software programmed to produce an automatic response by the electric drive motors without requiring pilot input in response to the processed information and automatically controlling operation of the electric drive motors to continue moving the one or more aircraft along the ground travel path and maintaining the defined clearance distance or stopping ground travel of the one or more aircraft as required to avoid collision between the one or more aircraft and moving and non-moving obstacles.

9. The method of claim 1, wherein the selected monitoring and sensing devices further comprise laser detectors, radar, sonar, nose or main landing gear wheel traction sensors, wind speed sensors, and global positioning sensors positioned in selected information-obtaining locations on the one or more aircraft exterior surfaces.

* * * * *